(12) United States Patent
Levine et al.

(10) Patent No.: US 7,540,408 B2
(45) Date of Patent: Jun. 2, 2009

(54) APPARATUS AND METHOD FOR FACILITATING MONEY OR VALUE TRANSFER

(75) Inventors: Judah Joseph Levine, Bethesda, MD (US); Ibrahima Ba, Superior, CO (US)

(73) Assignee: HIP Consult Inc., Briarcliff Manor, NY (US)

( * ) Notice: Subject to any disclaimer, the term of this patent is extended or adjusted under 35 U.S.C. 154(b) by 0 days.

(21) Appl. No.: 11/425,839

(22) Filed: Jun. 22, 2006

(65) Prior Publication Data

US 2007/0295803 A1 Dec. 27, 2007

(51) Int. Cl.
*G07F 19/00* (2006.01)
*G06Q 40/00* (2006.01)

(52) U.S. Cl. .................. 235/379; 705/35; 705/39
(58) Field of Classification Search .......... 235/379, 235/380; 705/17, 39, 41
See application file for complete search history.

(56) References Cited

U.S. PATENT DOCUMENTS

| | | |
|---|---|---|
| 5,388,836 A | 2/1995 | Foti |
| 5,448,043 A | 9/1995 | Nakano et al. |
| 5,592,376 A | 1/1997 | Hodroff |
| D385,548 S | 10/1997 | Paterson et al. |
| 5,687,323 A | 11/1997 | Hodroff |
| 5,742,932 A | 4/1998 | Levitsy |
| 5,757,917 A | 5/1998 | Rose et al. |
| 5,761,386 A | 6/1998 | Lawrence et al. |
| D395,878 S | 7/1998 | Copeland et al. |
| 5,806,050 A | 9/1998 | Shinn et al. |
| 5,826,241 A | 10/1998 | Stein et al. |
| D406,270 S | 3/1999 | Postrel et al. |
| 5,884,274 A | 3/1999 | Walker et al. |
| 5,897,621 A | 4/1999 | Boesch et al. |
| 5,897,625 A | 4/1999 | Gustin et al. |
| 5,949,044 A | 9/1999 | Walker et al. |
| 5,987,439 A | 11/1999 | Gustin et al. |
| 6,003,008 A | 12/1999 | Postrel et al. |
| 6,012,048 A | 1/2000 | Gustin et al. |
| 6,073,116 A | 6/2000 | Boyle |
| 6,128,598 A | 10/2000 | Walker et al. |
| 6,131,718 A | 10/2000 | Witschorik |
| 6,205,433 B1 | 3/2001 | Boesch et al. |
| 6,206,283 B1 | 3/2001 | Bansal et al. |
| 6,246,996 B1 | 6/2001 | Stein et al. |
| 6,249,781 B1 | 6/2001 | Sutton |
| 6,386,446 B1 | 5/2002 | Himmel et al. |
| 6,390,366 B1 | 5/2002 | Heidenreich et al. |
| 6,502,747 B1 | 1/2003 | Stoutenberg et al. |

(Continued)

FOREIGN PATENT DOCUMENTS

CN 1450781 A 10/2003

(Continued)

*Primary Examiner*—Steven S Paik
*Assistant Examiner*—April A Taylor
(74) *Attorney, Agent, or Firm*—Pearne & Gordon LLP

(57) ABSTRACT

An apparatus and method for transferring money or value, using a wide range of interfaces to initiate a transfer and a wide range of options for receiving the transfer, including receiving the transferred sum directly to the communication device/account of the receiver. The receiver can use the transferred sum as an airtime credit, to obtain cash or to pay for other goods or services.

40 Claims, 6 Drawing Sheets

U.S. PATENT DOCUMENTS

| | | |
|---|---|---|
| 6,554,184 B1 | 4/2003 | Amos |
| 6,600,919 B1 | 7/2003 | Kawase |
| 6,609,113 B1 | 8/2003 | O'Leary et al. |
| 6,658,394 B1 | 12/2003 | Khaishgi et al. |
| 6,704,714 B1 | 3/2004 | O'Leary et al. |
| 6,736,314 B2 * | 5/2004 | Cooper et al. ............... 235/380 |
| 6,805,284 B2 | 10/2004 | Himmel et al. |
| D498,240 S | 11/2004 | Amaitis et al. |
| 6,827,260 B2 | 12/2004 | Stoutenberg |
| 6,829,590 B1 | 12/2004 | Greener et al. |
| 6,886,742 B2 | 5/2005 | Stoutenberg |
| 6,912,510 B1 | 6/2005 | Shepherd |
| 6,922,673 B2 | 7/2005 | Karas et al. |
| 6,938,010 B1 | 8/2005 | Everson et al. |
| 6,938,013 B1 | 8/2005 | Gutierrez-Sheris |
| 6,941,282 B1 | 9/2005 | Johnson |
| 6,973,172 B1 | 12/2005 | Bitove et al. |
| 6,988,078 B1 | 1/2006 | Heidenreich et al. |
| 6,994,251 B2 | 2/2006 | Hansen et al. |
| 7,003,479 B2 | 2/2006 | Cowell et al. |
| 7,003,493 B2 | 2/2006 | Weichert et al. |
| 7,014,104 B2 | 3/2006 | MacFarlane et al. |
| 7,020,634 B2 | 3/2006 | Khaishgi et al. |
| 7,024,174 B2 | 4/2006 | Nagy et al. |
| 7,024,383 B1 | 4/2006 | Mancini et al. |
| 7,031,939 B1 | 4/2006 | Gallagher et al. |
| 2002/0029190 A1 | 3/2002 | Gutierrez-Sheris |
| 2002/0195486 A1 * | 12/2002 | Erb et al. .................... 235/379 |
| 2004/0059672 A1 | 3/2004 | Baig et al. |
| 2004/0098335 A1 * | 5/2004 | Michelsen et al. ............ 705/39 |
| 2004/0164145 A1 * | 8/2004 | Licciardello et al. ........ 235/381 |
| 2005/0167481 A1 | 8/2005 | Hansen et al. |
| 2006/0006224 A1 * | 1/2006 | Modi ........................ 235/379 |
| 2007/0124242 A1 * | 5/2007 | Reis ............................ 705/39 |

FOREIGN PATENT DOCUMENTS

| | | |
|---|---|---|
| EP | 1 372 089 A1 | 12/2003 |
| GB | 2 381 089 A | 4/2003 |
| KR | 3008739 A | 1/2003 |
| WO | 03/054820 A2 | 6/2003 |
| WO | 2004/100520 A1 | 11/2004 |
| WO | 2005/089199 A2 | 9/2005 |

* cited by examiner

APPARATUS AND METHOD FOR FACILITATING MONEY OR VALUE TRANSFER

BACKGROUND OF THE INVENTION

1. Field of the Invention

The present invention relates to money or value transfer systems in general, and to a method and apparatus for enabling worldwide access to financial services between individuals or entities.

2. Discussion of the Related Art

Historically, formal money transfer services have been dominated by three channels, namely money transfer organizations (MTOs), such as Western Union, banks that offer the service through diverse inter-bank networks as a value added offering to their banked customers, and postal offices that have leveraged their connecting wire and mail infrastructure to also provide money transfer services. Other informal unregulated services exist and are dominated by migrant entrepreneurs operating within specific corridors or ethnic groups.

Money transfer services can be classified on the basis of the origin and destination of the money. Domestic transfers of value are performed in a variety of ways, be it via cash, checks, electronic or credit/debit cards. The other type of transfer is cross-border or international transfers. Migrant community members in developed countries are significant users of such international transfers, also referred to as remittances, since they often send money to support family or community members in their homelands. Currently used methods for transferring money differ in the interface used by the sender and in whether the sender is banked or un-banked, i.e., whether he is using a checking account to pay for the transfer or not. A sender using an MTO has to visit a physical branch or retail outlet, such as a Wal-Mart store, often present identification, and fill in a form specifying the sender and receiver information and amount to be transferred. The sender then pays the total amount to be sent plus a convenience/commission charge with cash, debit, EFT or credit. The MTO agent enters the information into a computer terminal that creates and processes the transactions in real time—that is the money is made available for immediate pick up by the recipient. However, the recipient needs to be alerted or informed by the sender of the amount and transaction code in order to be able to claim the funds (often banks or agents do not inform the recipient of the transfer unless specifically instructed to do so by the sender, a step that incurs an additional fee for the sender). The recipient then proceeds to an MTO agent to withdraw the funds, often in local currency after an exchange rate, fixed by the MTO, has been applied. The exchange rate is generally lower than the wholesale rate (at which the MTO purchased the local currency) and the spread (difference between retail and wholesale rates) is kept by the MTO. Transfer is enabled by the MTO's own proprietary network.

The first method, as used by MTOs, requires a sender to visit a physical branch or retail outlet, present identification, fill a form specifying the transaction details and pay the amount to be sent plus a convenience/commission charge in cash, debit, EFT, or credit. Using the MTO system and network, the money is made available for immediate pick up by the recipient. The recipient is alerted of the transfer either by the sender, or by the MTO for an extra fee. The recipient then visits an MTO agent to withdraw the amount, possibly in local currency with an exchange rate which is lower than the rate at which the MTO purchased the local currency and the exchange differentials are kept by the MTO.

The second method involves banks, and requires the sender to have a bank account or credit card, and the recipient to possess a bank account with a local institution that is connected through a banking wire transfer network such as SWIFT/IBAN. The sender visits a local branch of a bank, and in a manner similar to the first method, initiates a transfer. The money is withdrawn from the sender's bank account and credited to the recipient's bank account. Alternatively, the receiver can withdraw the sum from an automatic teller machine (ATM) if one is available and if the recipient has an ATM card. The transaction may take between a few business days to two or more weeks to complete.

The third method is an extension the two previously described methods, but instead of the sender visiting a branch, or a bank, an online interface such as a web site is used. The sender is required to register and provide credit/debit card or bank account information, prior to initiating a transaction.

The fourth method is provided by mobile operators as an extension of their service offerings, and relies on their particular infrastructure to enable transactions. This method utilizes a mobile handset as an input/output device for transaction details. This service is not available outside specific corridors/regions.

All described methods necessitate a final stage, after the delivery of the money, which is the transaction settlement between the sending and the disbursing entities. These generally involve a settlement between the banks or institutions involved in the transfer of the money. This process is often costly as money exchanges hands several times through intermediary banks or institutions and value is lost during currency conversion.

Thus, existing methods for sending and receiving money are still costly because of the heavy reliance on "brick and mortar" operations, proprietary technology systems, and currency conversion. Moreover, they often cater to banked senders and are not ubiquitous in their coverage and access at the receiving end. In addition, conventional channels such as MTO and banks do not provide a seamless interface for senders and recipients where an individual can start a transaction on one interface but continue or check status on a different interface. Some methods which focus only on domestic markets require a lengthy and cumbersome authentication or registration process, making them inaccessible for most migrants and un-banked users and not an option for sending money worldwide. Methods that attempt to address the un-banked users rely on the creation of stored value accounts or the use of pre-loaded ATM cards.

There is therefore a need for a method and apparatus that will enable sending and receiving money in a variety of ways without necessarily having to physically visit a location on the sending end, and having to visit a physical branch on receiving end only to obtain cash (unless partners offer cash delivery), and on the receiving side. The method and apparatus should enable a receiver to utilize the transfer in a variety of ways, should cater to un-banked users, provide the sender the ability to check the status of a transaction, and be cost effective.

BRIEF DESCRIPTION OF THE DRAWINGS

The present invention will be understood and appreciated more fully from the following detailed description taken in conjunction with the drawings in which.

SUMMARY OF THE PRESENT INVENTION

Figure 1:
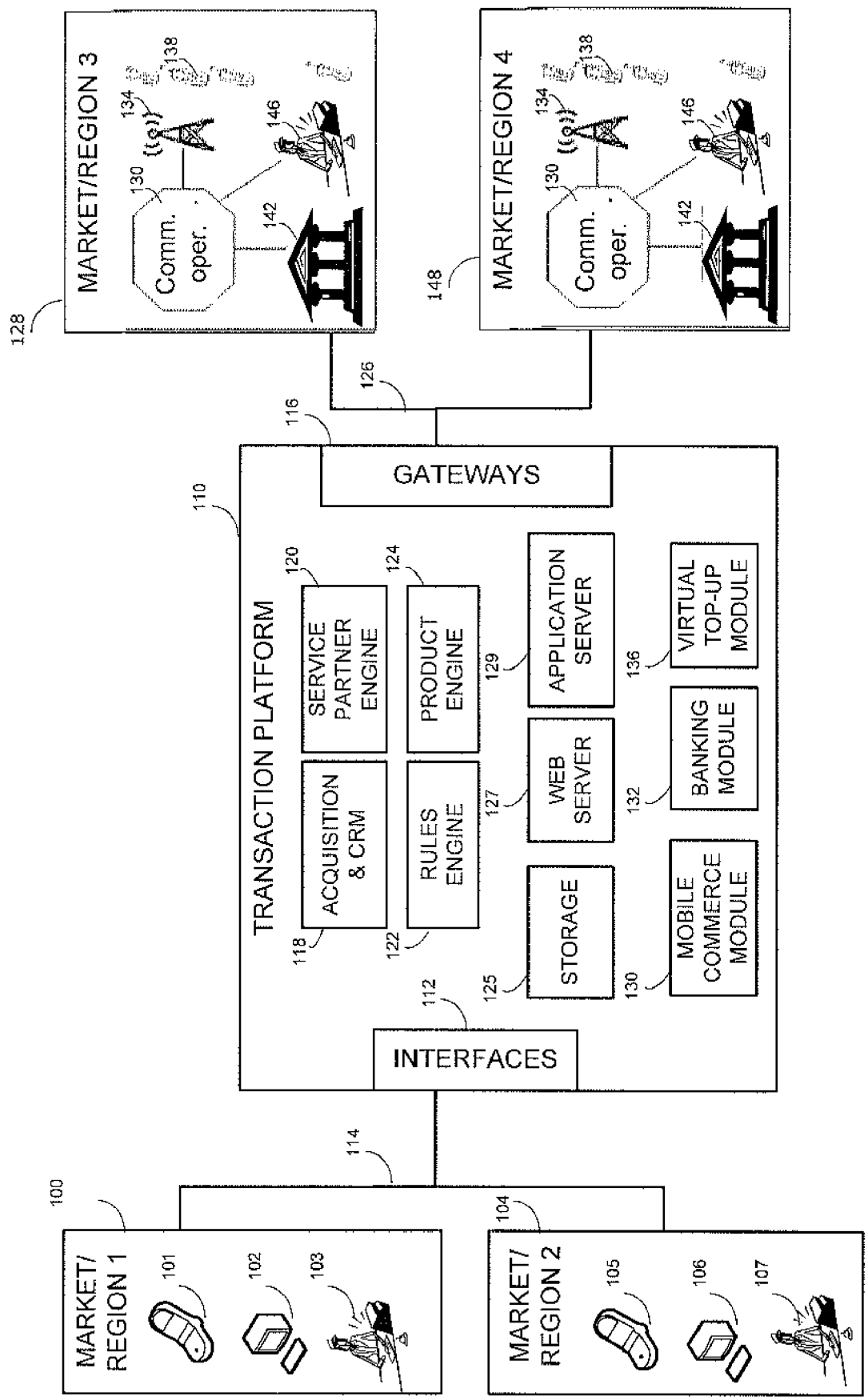
FIG. 1 is a block diagram of the overall value transfer apparatus, in accordance with a preferred embodiment of the disclosed invention.

It is an object of the present invention to provide a novel method and apparatus for money or value transfer. Thus, one aspect of the disclosed invention relates to an apparatus for transferring money or value from one or more senders to one or more receivers, the apparatus comprising: one or more protocol translators for translating one or more requests by the senders to an internal communication protocol; one or more gateways to one or more service partners, for adapting the internal communication protocol to a communication protocol used by the service partner; one or more customer relationship and acquisition engine for responding to the requests from the senders or the receivers; one or more rule engines for storing and applying one or more rules or one or more procedures to one or more transaction types; and one or more service partner engines for performing one or more activities related to the service partner. The service partner can be a communication operator, a financial institution, a distributor, a dealer or a retail outlet. The apparatus can further comprise a storage component for storing information related to a method, a transaction or a user of the apparatus. The apparatus can further comprise one or more product engines for advertising and delivery of one or more offerings. The offerings can relate to one or more of the group consisting of: a money transfer; an airtime vending service; a payment service; or a value transfer related service. The requests can be initiated through one or more of the following channels or device interfaces: physically visiting a communication operator shop, bank, distributor, dealer or retail outlet; calling a communication operator, bank, distributor, dealer or retail store; equipment used by a bank, a distributor, a dealer or a retail store; mobile phone or handheld device; fixed line phone; VOIP phone; fixed wireless access device; desktop or other terminals. The channels or device interfaces can be enabled through one or more access technologies selected from the group consisting of: copper, fiber, radio, cable, satellite, Wi-Fi, WiMAX, UWB, Bluetooth, IrDA, NFC or other. Within the apparatus, the request can be initiated through one or more of the following communication media or technology protocols or interfaces: Web browser, e-mail, instant messaging, SIM browser, desktop application interface, terminal application interface, IVR/Speech, voice, HTTP, HTTPS, SSL, USSD, SMS, WAP, DTMF, IP, or PSTN. The receivers can receive the transfer in a way belonging to the group comprised of: cash; communication usage time, one or more goods; one or more services; a deposit to a bank account; a deposit to a stored value account; a check; or a deposit to a credit or debit card account.

Another aspect of the disclosed invention relates to a method for money or value transfer from one or more senders to one or more receivers, the method comprising the steps of: selecting a transaction channel, device or interface; creating one or more units of value; transmitting the units of value to one or more service partners; distributing the units of value to the receivers; and settling financial commitments between one or more involved institutions. Within the method, the transaction channel or device is selected from the group consisting of: a dealer; a retail outlet; a distributor; a bank; a mobile phone; a handheld device; a fixed line phone; a VOIP phone; a fixed wireless access device; a desktop; or other terminals. The money or value transfer can be initiated through a communication media or technology protocols or interfaces selected from the group consisting of: Web browser; e-mail; instant messaging; SIM browser; desktop application interface; terminal application interface; IVR/Speech; Voice (mobile, fixed, VoIP); HTTP; HTTPS; SSL; USSD; SMS; WAP; DTMF; IP; or PSTN. The unit of value can comprise payment created in a way selected from the group consisting of: cash payment when physically visiting a branch, credit or debit card, money withdrawal from a stored value account with a bank, with a communication operator or with a service partner, money withdrawal from a dedicated account, or communication usage time. Within the method, the unit of value is distributed to receivers in a way selected from the group consisting of: cash, bank account deposit, value stored account deposit, credit or debit card deposit, communication usage time, one or more goods; or one or more services. The method can further comprise a bidding step for receiving one or more offers from one or more communication operators or service partners to perform a transaction, and selecting one or more of said offers. The method can further comprise a compliance step for asserting that the money or value transfer complies with one or more regulations. The method can further comprise a learning step for analyzing transaction history, predicting user behavior or suggesting an at least one customized offer or service to the sender. The method can further comprise a currency conversion step for suggesting to the senders an exchange rate, or a tracking step for tracking the one or more unit of value being transferred. The tracking step can be performed using one or more of the channels, devices or interfaces from the group consisting of: a mobile telephone; a handheld device; a fixed telephone; a voice over IP telephone; fixed wireless access devices; desktop or other terminals; physically visiting communication operator shop, bank, distributor, dealer or retail store; calling communication operator shop, bank, distributor, dealer or retail store; a bank; a distributor; a dealer; or a retail store. The tracking step can be performed using an at least one communication media or technology protocols or interfaces selected from the group consisting of: web browser; e-mail; instant messaging; SIM browser; desktop application interface; terminal application interface; IVR, speech; voice in mobile phone, voice in a fixed phone or voice over IP, HTTP; HTTPS; SSL; USSD; SMS; WAP; DTMF; IP; or PSTN. Within the method, the communication media or technology protocols or interfaces can be enabled through one or more access technologies selected from the group consisting of: copper, fiber, radio, cable, satellite, Wi-Fi, WiMAX, UWB, Bluetooth, IrDA, NFC or other.

Yet another aspect of the disclosed invention relates to a computer readable storage medium containing a set of instructions for a general purpose computer, the set of instructions comprising: selecting a transaction channel, device or interface; creating one or more units of value; transmitting the units of value to one or more service partners; distributing the units of value to a receiver; and settling financial commitments between one or more involved institutions.

DETAILED DESCRIPTION OF THE PREFERRED EMBODIMENT

The disclosed invention is aimed at providing an efficient method and apparatus for transferring money or value from a sender to a recipient. The sender can choose from a variety of available channels, physical devices, communication media and technological protocols and interfaces, including a physical branch, a web site, a mobile or handheld device, or others, to initiate a transfer. Once the sender has specified the transfer details, the system will either perform the transfer as instructed, similarly to a market order, or will issue a tender related to the different transfer parameters and automatically select an offer for him, or, if relevant, will let the sender select the offer that suits him best. The system will then execute the transfer. Wherever possible, the receiver will get an alert concerning the transfer in one of a variety of ways, such as text messaging, email or others. The receiver will receive the transferred value to a stored value account which may be accessed through a PSTN phone, a mobile phone or handheld device, internet connection, a desktop application or others, or through another channel, such as a bank, distributor/dealer, retailer or service provider. The receiver may cash the transferred value with a service partner associated with the service, deposit it into a bank account, use it as communication usage time (such as mobile airtime, fixed phone communication time, or the like), or receive it in the form of, or use it as a means to pay for, other goods or services. In the latter case, where goods and services are traded, payment for such may be made through a value transfer in the same way merchant transaction services are enabled by other technologies today. That is, once the recipient account has been credited with the value of the transfer, the recipient can exchange the value deposited into the account for goods and services provided by a participating service partner. It will be appreciated that the receiver can also receive or use the sum in any other method, currently known or that will become known in the future. Service partners associated with the apparatus and method may include one or more communication operator, bank, distributor, dealer, retailer, or the like. The communication or interaction with the service partner can relate to information associated with one or more transactions and/or the collection, disbursement or transfer of actual money or value associated with one or more transactions.

In the disclosed invention, the term channel generally refers to the user choosing to use the apparatus via calling or visiting a provider and interacting with an agent, or autonomously using the service via a device, such as a mobile phone or a computerized system. The term device or communication medium refers to a physical appliance or access device, such as a computer application, a mobile phone, a fixed phone, a handheld device or the like. The term interface refers to a method in which the selected device can be used, for example a mobile phone can be used through speech, IVR, SMS, WAP browser or the like. The term technology or technology protocol refers to the underlying protocols used by the selected device (or equipment used by an agent), such as IP, HTTP or WAP. The term access medium or access technology refers to the underlying physical medium, such as copper, fiber, radio, cable, satellite, Wi-Fi, Wi-MAX, UWB, Bluetooth, IrDA, NFC or other, utilized to carry information or to provide a connection between devices or communication media. If the user chooses to visit a branch associated with the service, he or she do not have to make other choices, but if, for example the user selects to use the service through a mobile phone, they may also have to choose an interface.

Referring now to FIG. 1, showing a block diagram of the overall value transfer apparatus, according to a preferred embodiment of the present invention. The left hand side of FIG. 1, comprising market/region 1 (100) and market/region 2 (104), shows possible channels and devices through which a sender can initiate a transaction. It will be appreciated that a region or a market can relate to, but is not limited to a specific country. Within each market a sender may initiate a money transfer through a mobile phone or another handheld device 101, using technological interfaces such as vocal communication or a text message, through the internet 102 or a desktop application, or through a representative of the service 103. Alternative embodiments include phone with IVR or speech, IP phone, PSTN phone, or others. Market 104 has similar options, and represents for example a different country or a different region. It will be appreciated that the disclosed invention covers any feasible, whether present or future combination of channels, devices and technological interfaces not listed above, such as voice communication via the internet, web access through a handheld device or the like. The money transfers are routed to platform 110 through a communication link 114. This link is either a dedicated wireline, or wireless network circuit or connection to the internet cloud, a virtual private network, or the like. Link 114 can be enabled by different access technologies or physical media such as copper, fiber, radio, cable, satellite, Wi-Fi or Wi-MAX, UWB, Bluetooth, IrDA, NFC or other. It will be appreciated that the system is not limited to supporting two markets, and is designed to support multiple markets. The right hand side of FIG. 1 shows the options available at the receiving end, such as region/market 3 (128), region/market 4 (148), or another region, country, market, or entity wherein the service is provided. Service partner 130 network infrastructures in country or region 1 (128) or in country or region 2 (148) can be leveraged to transmit remittance information and possibly usage options to a recipient. Service partner may include any of communication operator, bank, distributor, dealer, retailer, or any other entity currently known or that will become known in the future, associated with an apparatus or method executed in accordance with the disclosed invention. The communication or interaction with the service partner can relate to information associated with one or more transactions and/or the collection, disbursement or transfer of actual money or value associated with one or more transactions. A communication operator service partner can be a mobile, wireline, ISP, fixed/broadband wireless access, voice over IP (VoIP), or any other communication operator currently known or that will become known in the future. The infrastructure makes available remittance instructions or details to bank 142 so that a receiver's bank account may be credited, to a distributor/dealer 146 from which a receiver may collect the remittance, or directly to a mobile or handheld account 138 of a receiver through antenna 134, or any other user account, such as a fixed line account, a dedicated account or alternative value storage or distribution point, with onward distribution or usage options. As an alternative embodiment, the described service may be provided through a direct link between the transaction platform and any bank, distributor/dealer or other service partner, thus possibly bypassing or working in parallel to service partner 130. In addition to the actual transfer, wherever possible, the receiver is notified of the transfer, either through a text message sent to a mobile phone, or any other method, unrelated to the method selected for transferring the value. Thus, the communication between platform 110 and service partner 130 can relate to the actual transfer, if, for example, the value is to be received to a mobile or handheld device account, as well as for notifying the receiver about the transfer. Alternatively, the communication between platform 110 and the service partner, such as a mobile operator, can be utilized only for notifying the receiver about the transfer. It will be appreciated that the system is not limited to supporting two transfer-destination regions, and is designed to support multiple countries or regions. Transaction platform 110 communicates with network infrastructures 128, 148 via a communication link or circuit 126 which can be a dedicated line or use existing infrastructures. Communication link 126 can be enabled by different access technologies or physical media such copper, fiber, radio, cable, satellite, Wi-Fi or WiMAX, UWB, Bluetooth, IrDA, NFC or other. Transaction platform 110 is the core of the disclosed invention. Transaction platform 110 preferably comprises one or more computing platform, such as a personal computer, a mainframe computer, or any other type of computing platform that is provisioned with a memory device (not shown), a CPU or microprocessor device (not shown), and several I/O ports (not shown). In a preferred embodiment, platform 110 further comprises an application server 129 and optionally a web server 127 such as but not limited to Apache or internet information server (IIS). Web server 127 is required for offering users access to the apparatus using web based technologies. Application server 129 and web server 127 enable functionality associated with the disclosed invention. Alternatively, platform 110 can be a DSP chip, an ASIC device storing the commands and data necessary to execute the methods of the present invention, or the like. Platform 110 is further provisioned with, or in communication with, a mass storage device 125, such as a magnetic tape, a magnetic disc, an optical disc, a laser disc, a mass-storage device, or the like. The mass storage device is used for storing information, preferably in the form of one or more databases related to methods, transactions or users of the disclosed invention. Platform 110 comprises a number of modules detailed below. The modules are preferably implemented as software, i.e., sets or combinations of inter-related computer instructions and associated data structures that interact to carry out the relevant functionalities. Alternatively, these modules can be implemented as separate or integral DSP chips, ASIC devices, or the like. Platform 110 comprises acquisition and customer relationship (CRM) engine 118. Engine 118 is responsible for responding to customer requests for registration, authentication, transaction, billing, and transaction history. As the system gathers critical mass transaction data over time, module 118 is optionally leveraged for data mining and "system learning" capabilities to uncover customer behavior, push services and products based on customer transaction profile. Operators' engine 120 includes all the rules related to activities such as adding, deleting and configuring interaction with service partners or other channels. For instance, module 120 may access a data configuration file stored in the database or storage device 125 for each operator. The file contains all the data required to authenticate, connect, and access the operators' back-end systems such as billing and provisioning. The file may also store the identification numbers for the accounts that need to be debited or credited for transaction settlement. Platform 110 further comprises rules engine 122 which stores and validates the rules and procedures that need to be applied to various transaction types. For instance, registration and security rules are fired and bank authorization, debits/credits rules are validated by rules engine 122. Product engine 124, also comprised within platform 110, represents the service and product delivery platform, which is responsible for advertising and delivery of enabled offerings. For instance, money transfer, telecom airtime vending, and payment services will be presented to customers through product engine 124. It will be appreciated by a person of ordinary skills in the art that the product engine is not limited just to supporting the services described above, but rather it is designed to support subsequent products and services that exist today or will become known in the future. Platform 110 communicates with market 1 (100) and market 2 (104) and similarly with all markets through interfaces module 112, which provides gateways translation to different interfaces, including cellular, web and others. Incoming requests arriving through these channels are translated into a single application programming interface ("API"), which the platform can interpret. Interfaces module 112 is further detailed in association with FIG. 5 below. Platform 110 further communicates with various operators' communication protocols through gateways to service partners 116, which adapts the internal protocol to various communication protocols used by different service partners such as communication operators or banks. Gateways 116 are further detailed in association with FIG. 4 below. The mobile commerce module 130, banking module 132 and virtual top-up (VTU) module 136 are preferably third party applications with which the platform can integrate. Therefore, the platform implements interface code required to communicate with these external applications. The banking module allows direct transaction with banks (authentication, credit, debit, balance type of operations). The mobile commerce module enables support for different mobile operators' technologies (e.g. wireless access protocol "WAP", SIM browsers, Java phones, and the like). This module also enables access to communication providers (e.g., mobile operators) backend systems such as billing, account services, and SMS gateways. VTU module 136 is also a third party connection capability that enables the system to provide top-up services to its customers. Top-up services allow customers (individual end-users, dealers or distributors, and other partners) to load value onto an account (e.g. a mobile user account) or transfer value between accounts over the air (i.e. ., without the need to buy a scratch card or go to physical retail location of the operator). Transaction platform 110 can either host a complete VTU application or host an extension of the mobile operator's top-up application. It will be appreciated by a person of ordinary skill in the art that the components and structure of platform 110 is exemplary only, and platform 110 may have different, additional, more, less or alternative nodes, modules or other components to those depicted.

Figure 2:
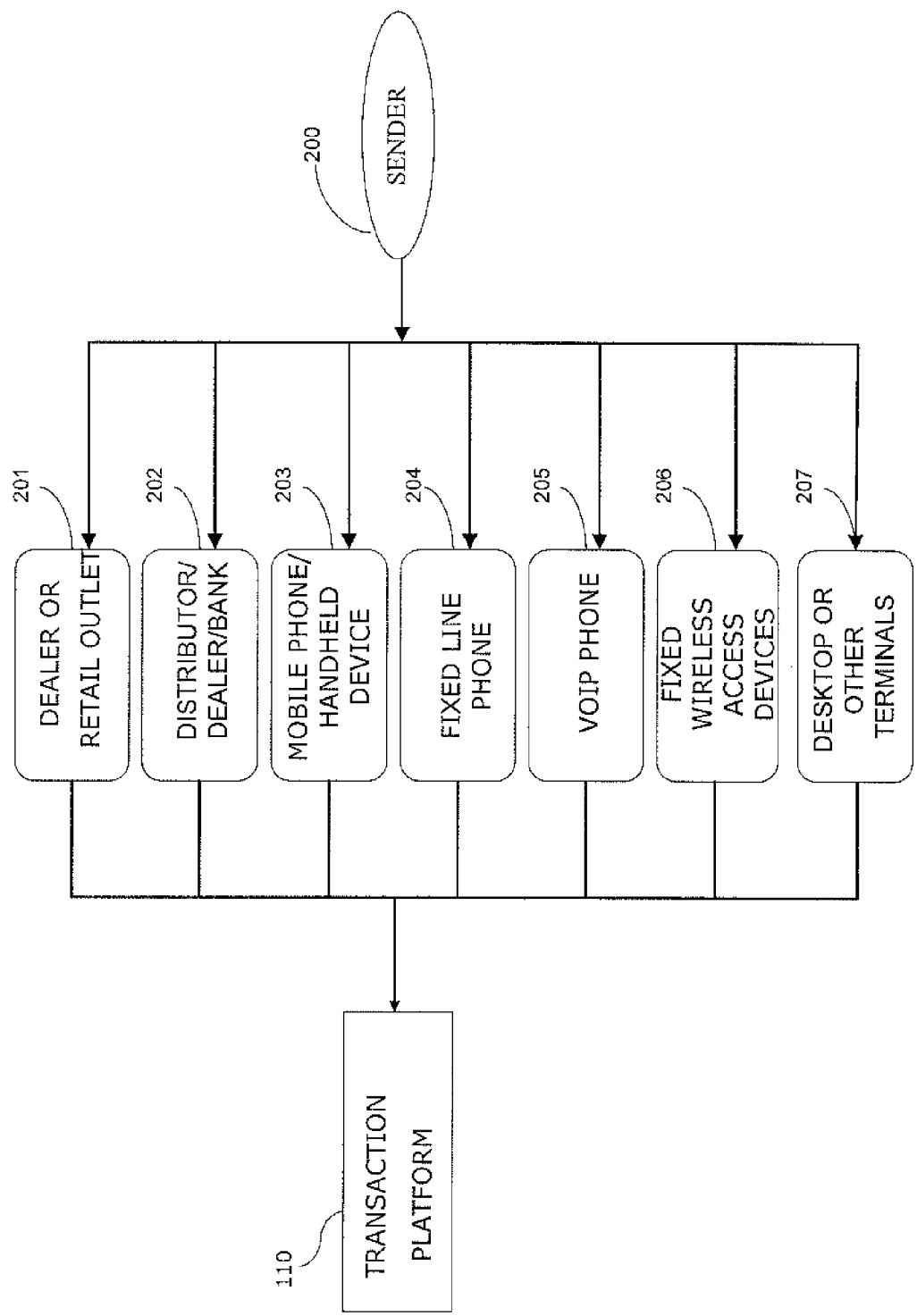
FIG. 2 is a block diagram of various channels and devices to be used by a sender, in accordance with a preferred embodiment of the disclosed invention.

Reference is now made to FIG. 2 which depicts various channels and physical devices that enable a sender to initiate a transfer. The architecture does not require that a customer be tied to a single channel, physical device, communication medium or interface technology, but can seamlessly alternate between various options, even within the same transaction. For instance, if a customer registers using the internet, he or she can at a later time connect through the phone using IVR/speech communication protocol to conduct a transaction. He or she could further check the status of that transaction through SMS communication protocol using a mobile phone. Channel 201 is a traditional "brick and mortar" operation, such as an associated distributor, dealer, retailer, communication operator shop, bank or another service partner. In order to use this option, sender 200 is required to visit, call or otherwise interface with a physical entity and transact with the platform through an employee of such entity. The latter will have direct access to transaction platform 110, through the internet or proprietary computer terminal/desktop application. Alternatively, the sender can visit a distributor or a bank site 202. Mobile phone or handheld device 203 provides the same functionality, through the uses of one of a number of technologies or communication protocols, including touch-tone Dual Tone Multi-Frequency (DTMF) pads used to interact with an IVR server hosted by platform 110 (not shown), Speech recognition, text or data messages, SIM browser, Wireless Application Protocol (WAP), Unstructured Supplementary Service Data (USSD) interfaces on the mobile device or any other communication protocol that will become known in the future. Platform system 110 responds to the request by opening up a secure session with sender 200. The usage of mobile as an interface provides enhanced ubiquity, access, and convenience, since the need for a computer or for visiting a retail location is eliminated. In yet another alternative, the user can use a fixed line phone 204, also employing IVR, speech recognition, or the like. Mobile phone or handheld device 203, fixed line phone 204, VoIP phone 205, and fixed wireless access devices 206, including WiMAX or Wi-Fi enabled devices, can interact with the system through a variety of communication media and technology options, including voice, internet and other data, offering a variety of attributes in terms of ubiquity, access and convenience. Another alternative is accessing the service through desktop or other terminal 207 or any other method for accessing internet or voice services. Using the system through the internet can be done through a standard web browser such as Internet Explorer, Netscape, AOL browser or FireFox using a secure connection (e.g. HTTPS, SSL or other security protocols) to exchange information between the client and the system. Using any of the abovementioned channels, devices, or technologies, the sender can pay or otherwise provide the payment details in a variety of ways: cash payment when physically visiting a branch, credit or debit card, direct withdrawal from a stored value account with a bank, with a communication operator, with a service partner (either in the form of money or service such as communication usage time, including mobile airtime, fixed phone communication time, Internet connectivity time, or the like), or with a dedicated account, or other methods.

Figure 3:
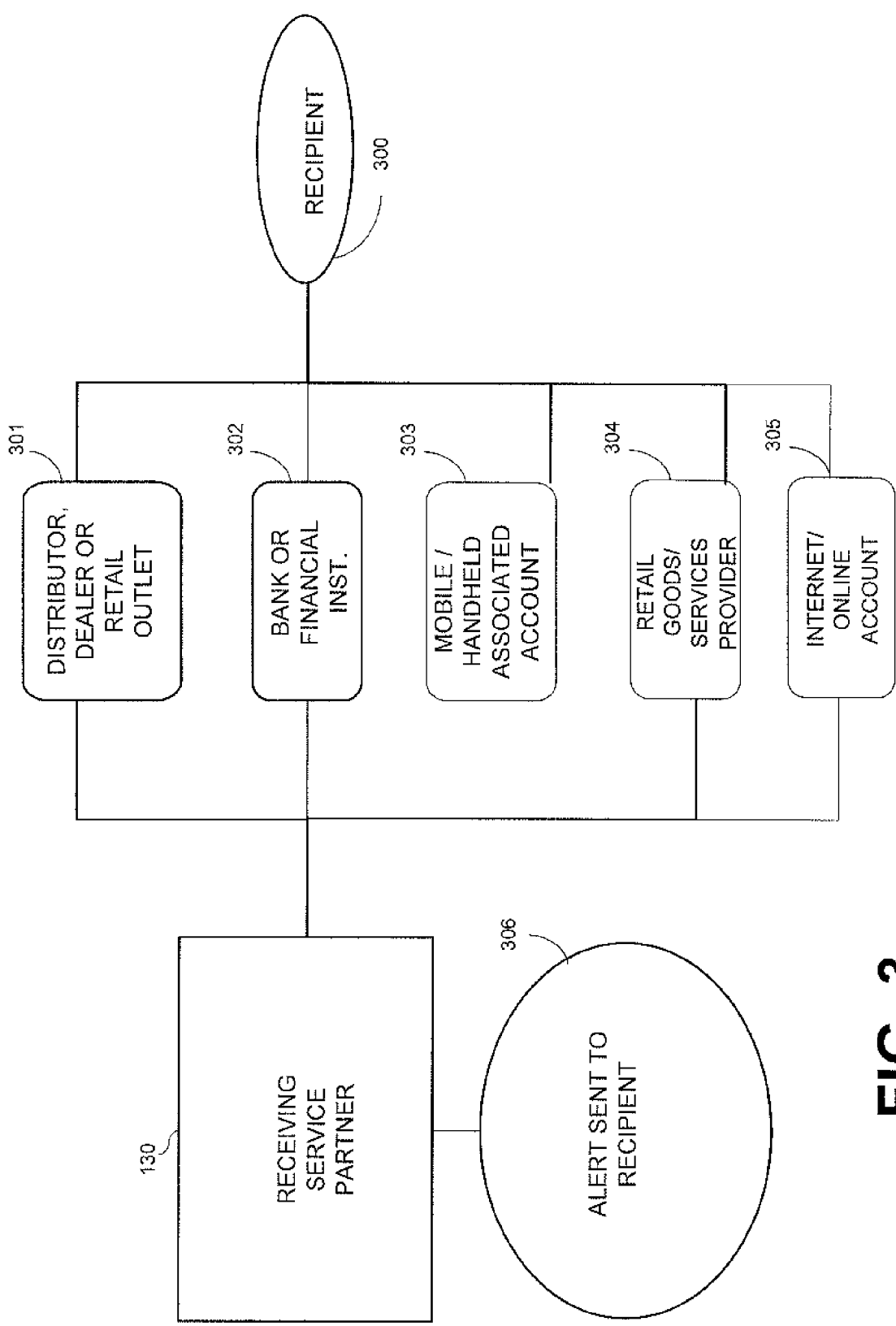
FIG. 3 is a block diagram of various channels and devices to be used by a receiver, in accordance with a preferred embodiment of the disclosed invention.

Referring now to FIG. 3, showing the various channels and devices recipient 300 can use to utilize or withdraw money or value. As in sender 200 of FIG. 2 case, recipient 300 can visit a distributor, dealer or retail outlet 301 (e.g. a mobile operator's shop or an authorized distributor or dealer) to collect the money or value that has been transferred. This enables the platform to provide coverage and access for the un-banked users (people without bank accounts), as well as banked individuals. The distributor, dealer or retail outlet communicates with receiving service partner 130 through an internet-enabled terminal or mobile interface. In some cases, a VTU application is loaded on the dealer/distributor device interface (e.g. mobile phone, handheld device, desktop or client terminal) and/or end-user device interface (typically a mobile phone or handheld device), and supported by a service partner's infrastructure. VTUs are commonly over-the-air applications that let distributors, dealers, retail outlets, and in some cases end users directly, conduct secure transactions with mobile or other communication operators and other service partners using their mobile phone, other communication device, or internet interface as transaction terminals. Another interface available to recipients is through banks and financial institutions 302. In this scenario, the transaction platform will link directly or indirectly through the communication network with the bank or financial institution. The receiver will then receive the transferred sum directly to her account. Alternatively or additionally, she can go to the bank, financial institution, ATM, or another institution or institution interface that allows for customers with relevant identification and information on the transfer to collect the cash due to her. Recipient 300 is preferably notified of the transfer through a mobile SMS message, an e-mail or other alerts 306 or directly by the sender of the transfer. Yet another interface is when receiver 300 receives the transfer directly to her stored value account which can be accessed through a mobile phone or handheld device 303. However, mobile phone or handheld device 303 requires the recipient or someone trusted by her to have such device in order to receive the value. In this case, recipient 300 gets credit on her mobile phone or handheld device account. The account is associated with and authenticated via the identification chip embedded or inserted by the user into the mobile phone or handheld device itself. In this scenario, recipient 300 is notified directly through a text message of the transfer 306. Thereafter, the recipient can decide whether to use the value as airtime, withdraw it as cash, or trade it (e.g. transfer equivalent stored value) for goods or services. To receive the value as physical goods or services, the receiver needs to visit (or request delivery from) a retail service provider 304 that is participating in the value transfer network (e.g. groceries shop, utility company, education/schooling or healthcare service providers). The service delivery and settlement process is similar to that provided by dealers/distributors, banks or other financial institutions in that the remittance information is used to settle transaction directly against the system. Finally, another interface where receiver 300 can get transfer is through an online account, including an internet/email accessible system-generated online value storage account, such as an electronic wallet, 305. The online account can be accessed through a desktop or any other terminal. This account will hold the information regarding the remittance and the recipient can either transfer the value to a different account such as a bank or credit card account or withdraw the money by a system or service partner-generated check or debit card, or visiting a participating financial institution.

Figure 4:
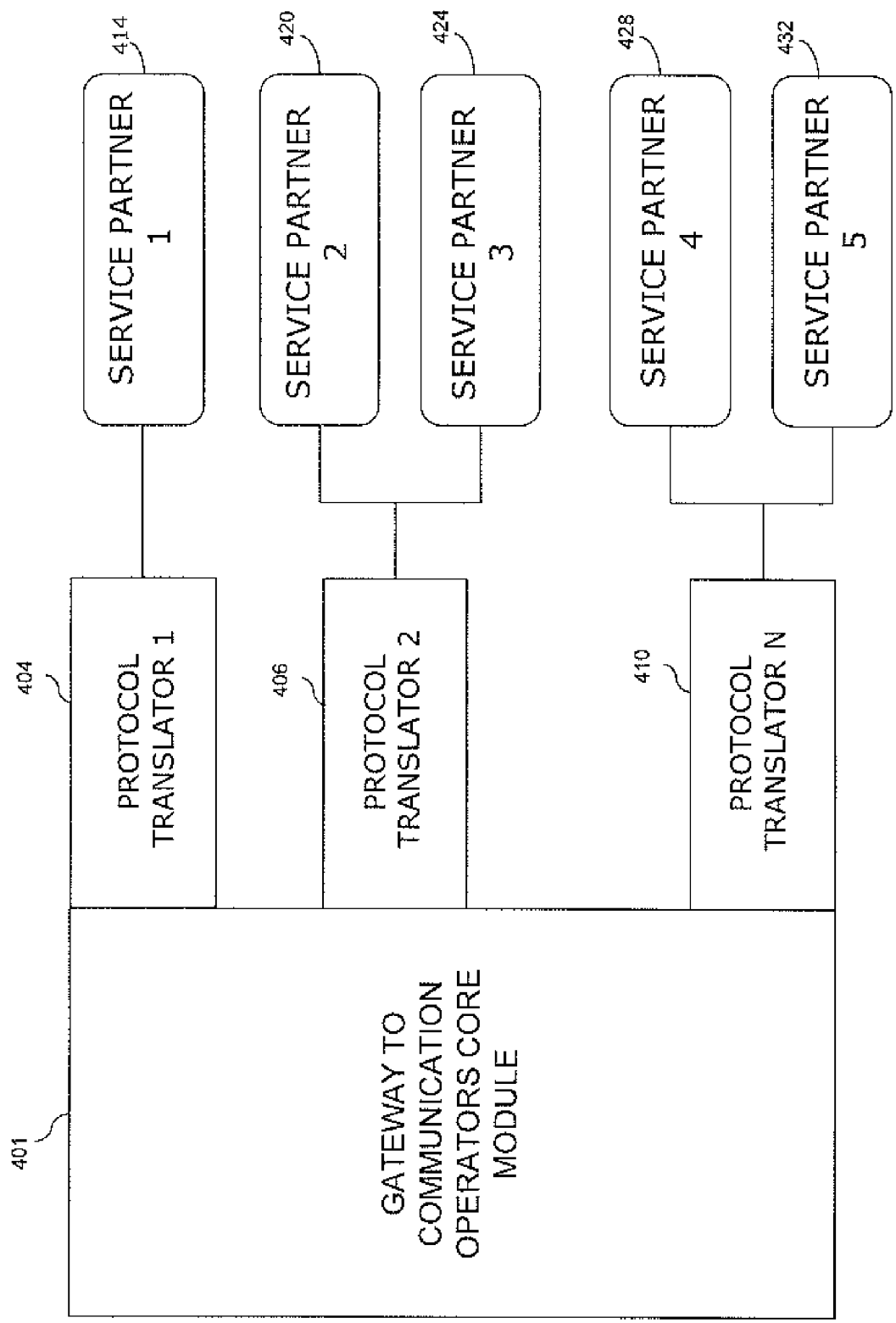
FIG. 4 is a block diagram of a translation mechanism of protocols, in accordance with a preferred embodiment of the disclosed invention.

Referring now to FIG. 4, showing a block diagram of gateways 116 of FIG. 1, implementing the translation mechanism of the various service partners' protocols. Gateways module 116 of FIG. 1 comprises a core module 401 that connects to various service partners. Core module 401 includes the non-protocol specific and common functionality needed to conduct transactions between platform 110 of FIG. 1 and the service partners. The functionality includes, for example, authentication at operator or at user levels, login, logout, billing, credit and debit transactions, which are common to all service partners. It will be appreciated by a person skilled in the art that although depicted and referred to as a single module, module 401 can comprise more than one module or node, or bear a different structure, if an implementer of the disclosed invention believes this will enhance performance, clarity or other purposes. Protocol translator 1 (404), protocol translator 2 (406) and additional ones, such as protocol translator n (410) perform the specific translation of data and parameters sequencing which are required to communicate with a specific service partner's backend system such as 414, 420, 424, 428 or 432. This architecture of shared functionality and multiple translators is important as service partners are likely to deploy backend systems from different vendors, so a protocol translation will allow platform 110 to simplify integration with various proprietary systems. As more communication operators or service partners are connected to platform 110, the likelihood of platform 110 to have their specific communication protocol already supported and translated increases. This provides a significant cost advantage versus existing point-to-point solutions.

Figure 5:
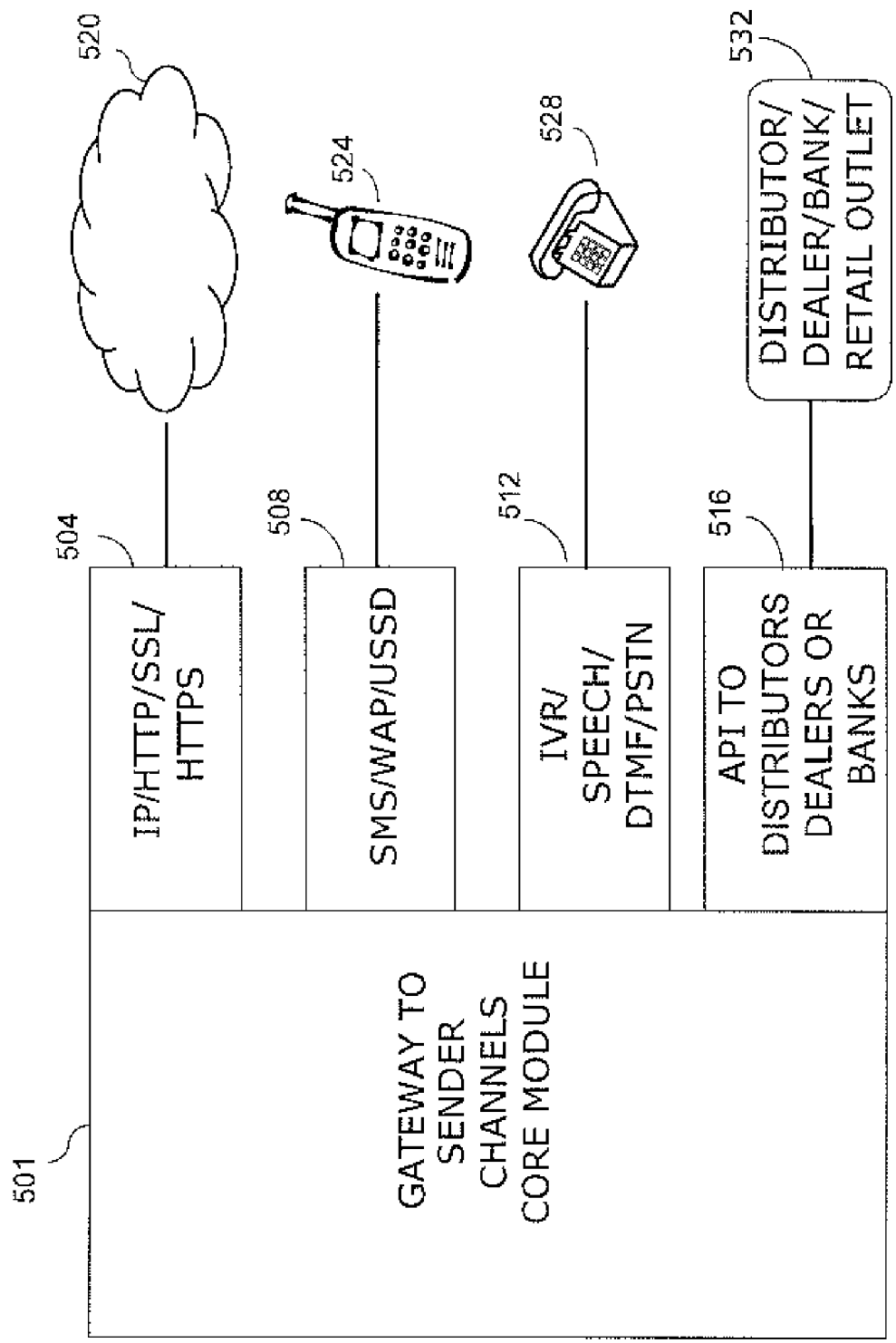
FIG. 5 is a schematic illustration of the sender interface gateway, in accordance with a preferred embodiment of the disclosed invention.

Reference is now made to FIG. 5 which embodies similar functionality as described in FIG. 4, but directed towards multiple communication protocols as used by senders. FIG. 5 is a detailed illustration of interfaces module 112 of FIG. 1. For each channel supported by the system, including but not limited to internet 520, SMS/WAP/USSD 524, IVR/speech 528, a distributor/dealer/bank/retail outlet station 532, there exists a translator that translates or adapts a request originating from a user using that type of interface into a uniform protocol used by the platform. For example, typically requests arriving through the internet are translated using an IP/HTTP/SSL/HTTPS protocol translator 504, requests arriving from a mobile phone are translated by an SMS/WAP/USSD translator 508, requests from a fixed phone are translated by an IVR/speech/DTMF/PSTN translator 512, and requests made through a distributor, dealer, bank, or other retail outlet are translated by a API 516. The various translators translate all requests into a uniform internal communication protocol used throughout the transaction application, including gateway to customer channels core module 501. Module 501 performs the tasks common to all requests regardless of their origin. Similar to module 401 of FIG. 4, module 501 can also be implemented as a collection of modules or in any other method. As user channels, devices and interfaces evolve, the disclosed architecture will permit the addition of new access devices and technologies by implementing corresponding adaptor translators.

Figure 6:
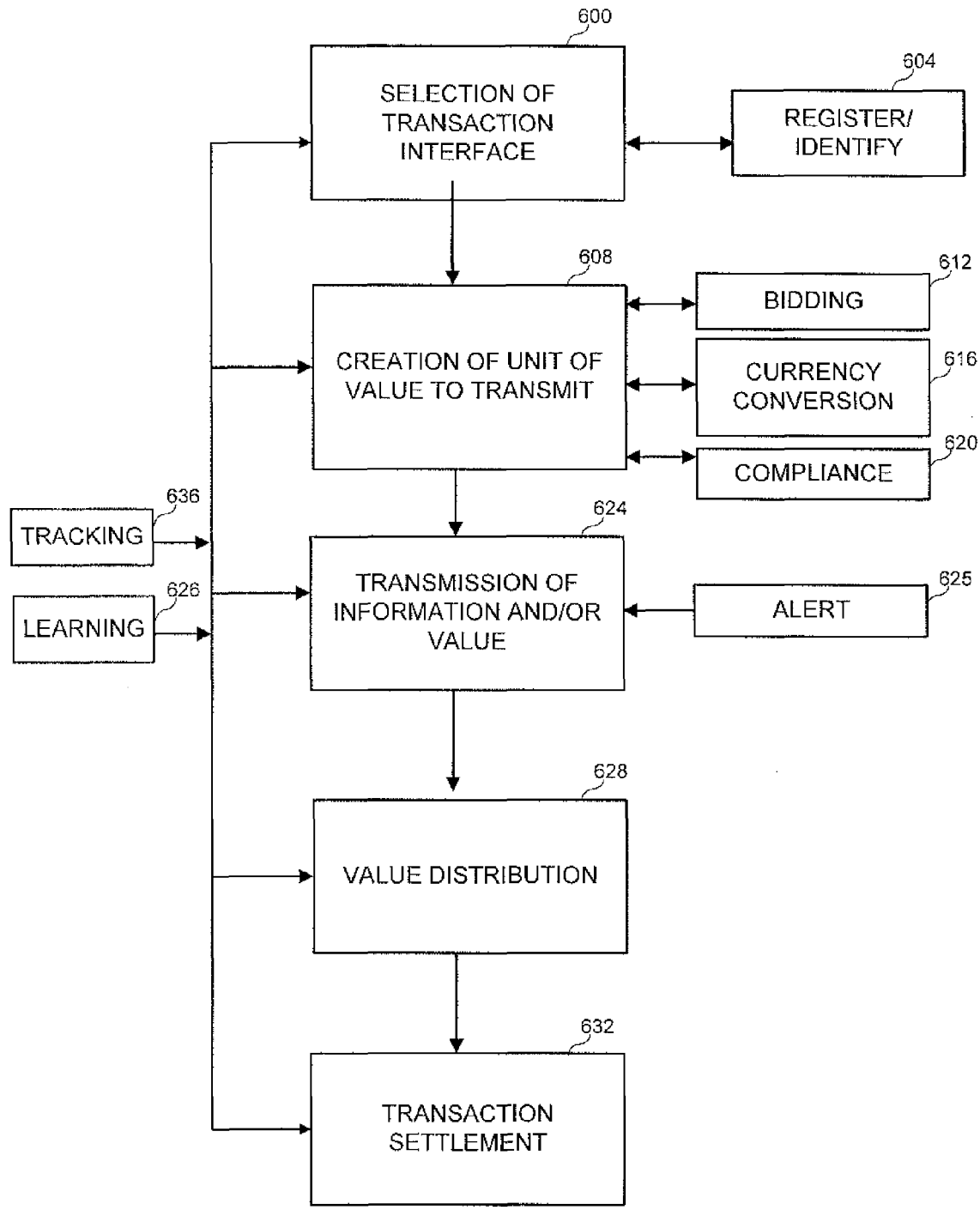
FIG. 6 is a flowchart of the main steps required to perform a money transfer transaction, in accordance with a preferred embodiment of the disclosed invention.

Referring now to FIG. 6, showing a flow chart of the main steps associated with the disclosed method. At selection of transaction channel or device interface step 600, a sender can choose among a multiplicity of channels or device interfaces to initiate a money or value transfer to a receiver. As detailed in association with previous figures, the channel or device interfaces typically include or consist of physically visiting a communication operator shop, bank, distributor, dealer or retail outlet; calling a communication operator, bank, distributor, dealer or retail store; specific equipment at a communication operator shop, a dealer or a retail store; mobile phone or handheld device; fixed line phone; VOIP phone; fixed wireless access device; desktop or other terminals or other channels or device interfaces currently known or that will become known in the future. Sometimes, after choosing a channel or device, the user may have to choose a specific technology, for example when using a mobile phone the user may have to choose between using voice, IVR, SMS, WAP or other technologies. In other cases, for example once a user obtained access to a web browser, he or she can use it in a default manner without having to worry about a specific technology. However, the selection of a particular channel, device interface, or technology is not obliging and the user can seamlessly and transparently switch to any other channel or device interface at any time. After selecting a channel or device interface, at step 604, the sender has to register with the system if this is the first time he is using the service, or identify and authenticate himself to the system during subsequent visits. The user's identity is authenticated by the system using standard techniques, such as PIN code, password, call back, mobile phone or handset device chip set, photo ID, fingerprint, eyeball recognition, speaker identification, or the like. At registration, the user optionally provides details of payment means, such as a credit/debit card number, a bank EFT, a bank account number, a cellular account number or the like. Upon subsequent transactions, the user can use the payment means associated with his transaction platform account or enter alternative payment details. Alternatively, payment means can be provided when transferring money and not during registration. At step 608 the system allows for transactions to be created, stored and executed independent of the actual channel, physical device, communication medium or technology interface used. To enable such capability, the system creates an interface-neutral object containing transaction information and status. The object includes the receiver's details, such as cellular number, a bank account number, a name, an address, an ID number, or any other details sufficient to identify the receiver. The sender can pay or otherwise provide the payment details in a variety of ways: cash payment when physically visiting a branch, credit or debit card, direct withdrawal from a stored value account with a bank, with a communication operator or with another service partner (either in the form of money or service such as airtime, or with a dedicated account, or other methods. The object may further include payment instructions, which can be done using any of the means detailed in association with step 600 above. The object also includes a sum to transfer, potentially the time frame within which the sum should be transferred and possibly additional details. The disclosed invention allows a unit of value to be created, stored and utilized in different forms. For instance, a unit of value could be stored as cash, service (such as airtime), or goods. The system performs the translation of quantity between the different denominations of value. Another usage of the invention allows senders to use a VTU application to either load (i.e., credit) their own account or transfer value directly to a recipient, possibly residing in a different country. Loading an account has the effect of creating a stored value which will hold an amount that can be accessed at a later time and/or from a different interface. In the latter case, the invention may extend top-up applications offered by operators to senders from different regions. That is, the sender can directly and remotely load value (credit) into a recipient's mobile or handheld accessed account and thereby transfer value. Bidding step 612, currency conversion step 616, and compliance step 620 are associated with step 608 but will be detailed below. At step 624, the transfer of information and/or value related to the transaction to the relevant communication provider, bank, distributor/dealer, or goods/service provider is effected. The value is transferred directly to the receiver's stored value account which may be accessed with a mobile phone or handheld device, bank account, other dedicated account, or via another channel. Preferably while the transfer is taking place, the receiver is notified or alerted at step 625. The alert can take the form of an SMS message, a vocal message, an e-mail or the like. In traditional methods, transfer step 624 is carried out through proprietary systems, Courier, Automatic Clearing House (ACH), banks, or the like. The transfer step embodies unique characteristics to the value transferring. A first characteristic is that the disclosed invention relies on a marketplace/exchange platform to link various senders and recipients worldwide. When using a marketplace platform, the system carries out the transaction according to the sender's explicit parameters, in market prices, in an analogous manner to a market order in a stock exchange. Alternatively, when using an exchange platform, the system employs the bidding mechanism detailed below in association with step 612. The marketplace/exchange is open to various types of participants through published APIs and can grow in importance, for example through network effects, with additional partners. Participants may include private users, operators, distributors, dealers, banks, and others which will spread the service among additional users. Thus, the disclosed invention uses a settlement method wherein the operators and other participants settle their transactions against the system, rather than against each other, thus minimizing their individual risk. Another characteristic of the invention is the use of existing communication service providers' infrastructure. Most traditional systems are proprietary or use mobile infrastructure in specific regions/corridors, so they are not widely available or easily scalable. The disclosed system makes the service available worldwide even in remote or sequestered areas. These elements and additional ones, such as bidding detailed in association with step 612 and learning detailed in association with step 626, drive the ability of the system to connect senders and recipients worldwide with limited incremental investment. Value distribution step 628 performs the actual distribution of value to the receiver. Most traditional systems enable the recipient to receive the money in one way, be it a bank account credit, a cash disbursement, or via courier. All these options are enabled to a recipient using the disclosed invention. The recipient then also has the options of receiving or consuming the value in different forms (e.g. dedicated account value, airtime credit, cash, top up an account or an electronic wallet credit, or goods/services). In addition, the disclosed method can use SMS or other notification mechanisms to alert the recipient's mobile phone or other communication device of the transfer. Transaction settlement step 632 involves settling financial commitments between the system and service partners (generally, communication providers, banks, distributors, dealers, retail outlets, or other involved entities), or between the system and sending and receiving parties, or between intermediaries or senders and receivers themselves. In traditional systems, this step involves direct settlement of obligations between sending and receiving parties and is usually limited to settlement, including possibly currency conversion, with service partners and banks. In the disclosed invention, settlement can alternatively be done against the system and not between parties. Furthermore, the disclosed invention can avoid the "middle man" (often central banks or large currency trading banks) and possibly provide favorable exchange rates to participating entities (e.g. mobile operators, banks, local distributors, or other service partners). This is made possible by the fact some service partners would rather not have their settlement payments converted into local currency of destination country, but deposited in a foreign currency account in the origin (sending) country. This can allow a service partner in a receiving country to have access to foreign exchange reserves without incurring the high transaction fees and/or inferior exchange rates often associated with going through local or central banks. Three components allow for better, more optimized access to foreign exchange reserves. First, the value transfer service allows domestic entities to more easily sell their products/services to migrants/foreigners (Diaspora segment), thereby enabling an export service. Second, the system creates a marketplace wherein senders and recipients of money transfer from the sending and the receiving sides may settle against the system and not against each other, without or with less actual money transfer moving through traditional channels, such as central banks, that generally charge large currency spread fees on transactions. Third, an entity selling its services to the Diaspora can choose to deposit its revenue earned in hard currency in a foreign bank account, thus avoiding back and forth money transfers. This is especially useful to firms, such as communication operators, which often need to repatriate profits to foreign investors. None of the existing money transfer systems is known to provide these benefits. As mentioned above, a particular advantage of the settlement mechanism is that all players settle against the system and not each other, thus minimizing risk and dependency associated with a single player. While the steps detailed above demonstrate the main flow of the disclosed method, there are additional aspects that provide advantages to users of the invention. Bidding step 612 is generally associated with creation of unit of value to transmit step 608. Step 612 involves receiving from a sender one or more parameters related to a contemplated value transfer transaction, including a destination, a sum to be transferred, a time frame for the transfer to be completed, a desired exchange rate, maximal transaction fee, or the like. The system then initiates a tender among participating service providers. All service providers willing to perform the transaction respond with their proposed terms, which may include time frame, exchange rates, fee, or the like. Offers can be specific to a particular transfer or more general and related to a large number of transfers. The system presents qualified offers based on the sender's minimum requirements. It then either lets the sender choose between the offer/s presented by the system, or, at the sender's discretion, selects the offer that best fits the user's terms. Thus, the system allows senders and recipients to improve value transfer services. For instance, multiple communication operators or other service partners in a specific country can bid to receive an authorization to transfer value. Alternatively, a large portion of performed transactions are performed by standard service providers employing associated rules that will govern marketplace transactions, similarly to buying or selling stock in a market order, while the bidding mechanism detailed above is more similar to buying or selling stock with a limit order. Another aspect of the invention is currency conversion step 616. By matching buyers and sellers of currency, this process may enable the system to offer users attractive exchange rates, i.e., smaller exchange differentials than those set by most banks or MTOs, while still providing financial revenue to the system participants. Yet, another important aspect of the invention is the compliance step 620. The process can be used for asserting that a certain transfer is in accordance with currency or other regulations associated with the sending country or with the receiving country, as stored and updated by the system, such as maximal amount permitted to be exported or imported from or to a specific country over a specific period of time, etc. A transaction that does not comply with any of them, for example since it involves a sum which is higher than a permitted limit, will be cancelled and a notification will optionally be sent to the sender and/or to the receiver. Learning step 626, analyzes transaction history data to predict user behavior, presents customized offers and services such as repeat transfers, suggests transfers when the exchange rate drops, or the like. It will be appreciated by a person skilled in the art that steps 612, 616, 620, and 626 can be associated with steps 608 and 624 as indicated in FIG. 6, but can optionally be associated with another step, or comprise one or more independent steps within the method. An additional step supported by the system is tracking step 636. Due to the transparency of the interface to the system, the sender or the receiver can track the transaction at any time and using any channel, such as visiting an associated distributor, dealer, retailer, bank or other service partner, any device, such as a mobile phone, a handheld device, a desktop or terminal application, running over any communication media or protocol such as IP or PSTN, or technology interface, such as voice, IVR, speech recognition, text messaging, WAP, or USSD, or the like. The tracking process is not limited to the channel, device interface the user selected to initiate the transaction. It is preferably enabled at the time the transaction is initiated, but the relevant tracking information can still be accessed through various channels and device interfaces and the data is still available, even after the transferred value is distributed and transaction is settled.

It should be appreciated that other methods, which may include one or more of the suggested steps, may be designed to suitably perform the concepts of the present invention in other manners. Such alternative methods and modes are also covered by the present invention.

The disclosed invention can be extended in multiple directions, in order to support additional interfaces, transfer channels, communication media, methods for providing more financial and other options to the users and the like, without departing from the spirit of the disclosed invention.

The disclosed invention provides an effective and efficient method and apparatus for worldwide transfer of money or value. The method and apparatus enable banked or unbanked users to send money, and recipients even in remote or sequestered areas to receive the transfer directly to their communication device and use the value either as airtime, money, goods or services, and payment therefore. The disclosed invention leverages existing infrastructures and thus does not impose heavy burden on an implementer or participant. The disclosed invention enables the system to learn the habits or needs of participants/users and gradually cater for them, and moreover can support competitive economic terms relative to traditional systems, by implementing more efficient technology, process and bidding mechanism.

The disclosed invention caters for the build of an open API, and leverages standard communication protocols such as IP, HTTP, WAP, SMS, and does neither rely solely on proprietary network systems or existing financial transaction networks (e.g. ATM, credit card, or the like) for delivery the described functionality, nor require the installation of proprietary software at their premises for service partner participation. The disclosed invention supports multiple client and server technologies. Further, the disclosed invention enables a new method of money or value transfer that enables the bypassing of buying or selling of foreign currency from traditional brokers such as currency exchanges, central banks or financial institutions in order to settle accounts. The disclosed invention caters for settlements to be done between service partners and the system, or between sending and receiving parties and the system, or between intermediaries or senders or receivers themselves. The invention further allows for funds due from settlement transactions to be retained in foreign currency accounts residing in the country of origin thus reducing or all together avoiding the need for currency conversion.

It will be appreciated by persons skilled in the art that the present invention is not limited to what has been particularly shown and described hereinabove. Rather the scope of the present invention is defined only by the claims which follow.

We claim:

1. An apparatus for money or value transfer from at least one sender to at least one receiver using at least one service partner, the apparatus comprising at least one computing platform, executing the components of:
    at least one protocol translator for translating at least one current request relating to the money or value transfer by the at least one sender to an internal communication protocol;
    at least one gateway to the at least one service partner, for adapting the internal communication protocol to at least one communication protocol used by the at least one service partner;
    at least one customer relationship and acquisition engine for responding to the at least one current request from the at least one sender or at least one receiver, and for suggesting to the at least one sender at least one customized service or at least one customized product based on at least one past request for registration, transaction, billing or historical transactions performed by the sender wherein the at least one customized service or the at least one customized product is separate from the at least one current request;
    at least one rule engine for storing, validating, and applying at least one rule or at least one procedure to at least one transaction type, wherein the at least one rule or the at least one procedure relates to a country of the sender or a country of the received, said at least one rule engine running on said computing platform; and
    at least one service partner engine for performing at least one activity related to the at least one service partner.

2. The apparatus of claim 1 wherein the at least one service partner is a communication operator.

3. The apparatus of claim 1 wherein the at least one service partner is a bank or a financial institution.

4. The apparatus of claim 1 wherein the at least one service partner is a distributor or a dealer or a retail outlet.

5. The apparatus of claim 1 further comprising a storage component for storing information related to a method, a transaction or a user of the apparatus.

6. The apparatus of claim 1 further comprising at least one product engine for advertising and delivery of at least one offering.

7. The apparatus of claim 6 wherein the offering relates to at least one item selected from the group consisting of: a money transfer; an airtime vending service; a payment service; and a value transfer related service.

8. The apparatus of claim 1 wherein the at least one current request is initiated through at least one of the following channels or device interfaces: physically visiting a communication operator shop, bank, distributor, dealer or retail outlet; calling a communication operator, bank, distributor, dealer or retail store; equipment used by a bank, a distributor, a dealer or a retail store; mobile phone or handheld device; fixed line phone; VOIP phone; fixed wireless access device; desktop or other terminals.

9. The apparatus of claim 8 wherein the channels or device interfaces are enabled through at least one access technology selected from the group consisting of: copper, fiber, radio, cable, satellite, Wi-Fi, WiMAX, UWB, Bluetooth, IrDA, and NFC.

10. The apparatus of claim 1 wherein the at least one current request is initiated through at least one of the following communication media or technology protocols or interfaces: Web browser, e-mail, instant messaging, SIM browser, desktop application interface, terminal application interface, IVR/Speech, voice, HTTP, HTTPS, SSL, USSD, SMS, WAP, DTMF, IP, or PSTN.

11. The apparatus of claim 1 wherein the at least one receiver receives the transfer in a way belonging to the group consisting of: cash; communication usage time, at least one good; at least one service; a deposit to a bank account; a deposit to a stored value account; a check; and a deposit to a credit or debit card account.

12. The apparatus of claim 1 wherein the at least one service partner participates in performing the money or value transfer.

13. A method for money or value transfer from at least one sender to at least one receiver, the method comprising the steps of:
    a. selecting a transaction channel, device or interface;
    b. ascertaining that the money or value transfer is in accordance with at least one rule or at least one procedure or an at least one regulation associated with a country of the at least one sender or with a country of the at least one receiver;

c. if the money or value transfer is not in accordance with the at least one rule or at least one procedure or at least one regulation, cancelling the money or value transfer, otherwise continuing with the money or value transfer;
d. creating at least one unit of value;
e. transmitting the unit of value to at least one service partner;
f. distributing the unit of value to the receiver;
g. settling financial commitments between one or more involved institutions; and
h. analyzing at least one current request for registration, transaction, billing, or transaction history of the sender for predicting the behavior of the at least one sender or suggesting at least one customized offer or service to the at least one sender wherein the at least one customized offer or service is separate from the at least one current request.

14. The method of claim 13 wherein the transaction channel or device is selected from the group consisting of: a dealer; a retail outlet; a distributor; a bank; a mobile phone; a handheld device; a fixed line phone; a VOIP phone; a fixed wireless access device; a desktop; and other terminals.

15. The method of claim 13 wherein the money or value transfer is initiated through a communication media or technology protocols or interfaces selected from the group consisting of: Web browser; e-mail; instant messaging; SIM browser; desktop application interface; terminal application interface; IVR/Speech; Voice (mobile, fixed, VoIP); HTTP; HTTPS; SSL; USSD; SMS; WAP; DTMF; IP; and PSTN.

16. The method of claim 13 wherein the unit of value comprises payment created in a way selected from the group consisting of: cash payment when physically visiting a branch, credit or debit card, money withdrawal from a stored value account with a bank, with a communication operator or with a service partner, money withdrawal from a dedicated account, and communication usage time.

17. The method of claim 13 wherein the unit of value is distributed to the at least one receiver in a way selected from the group consisting of: cash, bank account deposit, value stored account deposit, credit or debit card deposit, communication usage time, at least one good; and at least one service.

18. The method of claim 13 further comprising a bidding step for receiving at least one offer from at least one communication operator or service partner to perform a transaction, and selecting at least one of said offers.

19. The method of claim 18 wherein the bidding step comprises receiving an at least one offer that meets a minimal requirement set by the at least one sender.

20. The method of claim 13 further comprising a currency conversion step for suggesting to the at least one sender an exchange rate.

21. The method of claim 13 further comprising a tracking step for tracking the at least one unit of value being transferred.

22. The method of claim 13 wherein at least one of steps a, d, e, f or g is performed using at least one of the channels, devices or interfaces from the group consisting of: a mobile telephone; a handheld device; a fixed telephone; a voice over IP telephone; fixed wireless access devices; desktop or other terminals; physically visiting communication operator shop, bank, distributor, dealer or retail store; calling communication operator shop, bank, distributor, dealer or retail store; a bank; a distributor; a dealer; and a retail store.

23. The method of claim 13 wherein at least one of steps a, d, e, f or g is performed using at least one communication media or technology protocols or interfaces selected from the group consisting of: web browser; e-mail; instant messaging; SIM browser; desktop application interface; terminal application interface; IVR, speech; voice in mobile phone, voice in a fixed phone or voice over IP, HTTP; HTTPS; SSL; USSD; SMS; WAP; DTMF; IP; and PSTN.

24. The method of claim 23 wherein the communication media or technology protocols or interfaces are enabled through at least one access technology selected from the group consisting of: copper, fiber, radio, cable, satellite, Wi-Fi, WiMAX, UWB, Bluetooth, IrDA, and NFC.

25. The method of claim 13 further comprising a learning step for analyzing the at least one current request.

26. The method of claim 25 wherein the learning step predicts user behavior, suggests repeat transfers, or suggests transfers when an exchange rate drops.

27. The method of claim 13 further comprising a step of sending a notification if the money or value transfer is not in accordance with the at least one rule or at least one procedure or at least one regulation.

28. The method of claim 27 wherein the notification is sent to the sender or to the receiver.

29. The method of claim 13 further comprising a step of matching currency buyers and sellers, for offering users attractive exchange rates.

30. The method of claim 13 further comprising a step of suggest to the at least one sender to perform a transfers when an exchange rate drops.

31. The method of claim 13 wherein the at least one sender and the at least one receiver settle a commitment against an operator of the method.

32. A computer readable storage medium containing a set of instructions for a general purpose computer, the set of instructions comprising:
   selecting a transaction channel, device or interface;
   ascertaining that a money or value transfer from a sender to a receiver is in accordance with at least one rule or at least one procedure or at least one regulation associated with a country of the sender or with a country of the receiver;
   if the money or value transfer is not in accordance with the at least one rule or at least one procedure or at least one regulation, cancelling the money or value transfer, otherwise continuing with the money or value transfer;
   creating at least one unit of value;
   transmitting the unit of value to at least one service partner;
   distributing the unit of value to a receiver;
   settling financial commitments between one or more involved institutions; and
   analyzing at least one current request for registration, transaction, billing, or transaction history of the sender for predicting behavior of the at least one sender or suggesting at least one customized offer or service to the at least one sender, wherein the at least one customized offer or service is separate from the at least one current request.

33. A method for money or value transfer from at least one sender in at least one first market or region to at least one receiver in at least one second market or region using at least one service partner, the method comprising the steps of:
a. the sender selecting a transaction channel, device or interface;
b. ascertaining that the money or value transfer is in accordance with at least one rule or at least one procedure or at least one regulation associated with a country of the at least one sender or with a country of the at least one receiver;
c. if the money or value transfer is not in accordance with the at least one rule or at least one procedure or at least one regulation, cancelling the money or value transfer, otherwise continuing with the money or value transfer;

d. creating at least one unit of value according to the money or value to be transferred;

e. transmitting the unit of value to at least one service partner;

f. distributing the money or value to the receiver, according to the unit of value;

g. settling financial commitments between one or more involved institutions; and h. learning from transaction history data for analyzing at least one current request for registration, transaction, billing, or transaction history of the sender for predicting the behavior of the at least one sender or suggesting at least one customized offer or service to the at least one sender, wherein the at least one customized offer or service is not suggested as a response to the at least one current request.

34. The method of claim 33 further comprising a currency conversion step for suggesting to the at least one sender an exchange rate.

35. The method of claim 33 further comprising a step of suggesting to the at least one sender at least one qualified offer based on a minimal requirement set by the at least one sender.

36. The method of claim 33 further comprising a step of matching currency buyers and sellers, for offering users attractive exchange rates.

37. The method of claim 33 further comprising a step of suggest to the at least one sender to perform a transfers when an exchange rate drops.

38. The method of claim 33 wherein the at least one sender and the at least one receiver settle a commitment against an operator of the method.

39. An apparatus for supporting money or value transfers from at least one sender to at least one receiver using a plurality of different service partners, the apparatus comprising at least one computer executing the components of:

a plurality of protocol translators, each one of said protocol translators adapted for connecting to at least one corresponding service partner to translate a communication protocol used by said at least one corresponding service partner to an internal communication protocol such that each one of said plurality of protocol translators is adapted for translating a different communication protocol to said internal communication protocol;

a gateway connected to each one of said plurality of protocol translators, said gateway using said internal communication protocol, wherein each one of said plurality of protocol translators is adapted for receiving money transfer requests from senders to send money to receivers, said requests via the corresponding at least one service partner, such that the different communication protocols of the money transfer requests are translated by said protocol translators into said internal communication protocol and forwarded to said gateway;

a customer relationship and acquisition engine connected to said gateway and for responding to the current requests received from the senders;

at least one rule engine for storing, validating, and applying at least one rule or at least one procedure to the money transfer request, wherein the at least one rule or the at least one procedure relates to a country of the sender or a country of the receiver, said at least one rule engine running on said computing platform; and a plurality of service partner engines, each one of said plurality service partner engines corresponding to a corresponding at least one of said plurality of service partners and specifically adapted for performing at least one activity related to the corresponding at least one service partner, such that each of said service partner engines is adapted differently from another one of said service partner engines.

40. The apparatus of claim 39, wherein said at least one customer relationship and acquisition engine is also adapted for suggesting to each one of the senders at least one customized service or at least one customized product based on at least one past request for registration, transaction, billing or historical transactions performed by the each one sender wherein the at least one customized service or the at least one customized product is separate from the money transfer request of the at least one sender.

* * * * *